(12) United States Patent
Markley

(10) Patent No.: US 7,740,555 B2
(45) Date of Patent: Jun. 22, 2010

(54) SPROCKET TOOTH PROFILE FOR A ROLLER OR BUSH CHAIN

(75) Inventor: George L. Markley, Montour Falls, NY (US)

(73) Assignee: BorgWarner Inc., Auburn Hills, MI (US)

(*) Notice: Subject to any disclaimer, the term of this patent is extended or adjusted under 35 U.S.C. 154(b) by 823 days.

(21) Appl. No.: 11/251,415

(22) Filed: Oct. 14, 2005

(65) Prior Publication Data

US 2007/0087880 A1  Apr. 19, 2007

(51) Int. Cl.
F16H 7/06 (2006.01)
F16H 55/30 (2006.01)

(52) U.S. Cl. ...................... 474/156; 474/157

(58) Field of Classification Search .............. 474/152, 474/156, 160, 202, 157, 144; 305/115
See application file for complete search history.

(56) References Cited

U.S. PATENT DOCUMENTS

| | | | |
|---|---|---|---|
| 2,667,792 A | 2/1954 | Bendall | 74/245 |
| 2,725,755 A | 12/1955 | Riopelle et al. | 74/229 |
| 3,448,629 A | 6/1969 | Pfrank et al | 74/229 |
| 4,036,071 A | 7/1977 | McKnight et al. | 74/243 R |
| 4,099,424 A | 7/1978 | Pemberton | 74/251 |
| 4,116,081 A | 9/1978 | Luttrell et al. | 74/243 R |
| RE30,018 E | 6/1979 | Clemens et al. | 74/243 R |
| 4,738,653 A | 4/1988 | Riewerts et al. | 474/156 |
| 4,758,209 A | 7/1988 | Ledvina | 474/156 |
| 5,192,252 A | 3/1993 | Skurka et al. | 474/210 |
| 5,397,278 A | 3/1995 | Suzuki et al. | 474/156 |
| 5,419,743 A | 5/1995 | Takeda et al. | 474/157 |
| 5,848,948 A | 12/1998 | Allen | 474/156 |
| 5,876,295 A | 3/1999 | Young | 474/156 |
| 5,921,877 A | 7/1999 | Suzuki | 474/156 |
| 5,921,878 A | 7/1999 | Young | 474/160 |
| 5,993,344 A | 11/1999 | Young | 474/160 |
| 5,997,424 A | 12/1999 | Young | 474/156 |
| 6,030,306 A | 2/2000 | Young | 474/111 |
| 6,036,614 A | 3/2000 | Baddaria | 474/155 |
| 6,179,741 B1 | 1/2001 | Young | 474/161 |
| 6,325,734 B1 | 12/2001 | Young | 474/202 |
| 6,736,744 B1 | 5/2004 | Wigsten et al. | 474/152 |
| 6,761,657 B2 | 7/2004 | Young | 474/202 |
| 2003/0186766 A1 | 10/2003 | Wang et al. | 474/152 |
| 2005/0009655 A1 | 1/2005 | Kubo et al. | 474/152 |

FOREIGN PATENT DOCUMENTS

| | | | |
|---|---|---|---|
| JP | 55024203 A | * | 2/1980 |
| JP | 56150655 A | * | 11/1981 |
| JP | 09042423 A | | 2/1997 |
| JP | 2002340142 A | | 11/2002 |

* cited by examiner

Primary Examiner—Robert A Siconolfi
Assistant Examiner—Stephen Bowes
(74) Attorney, Agent, or Firm—Brown & Michaels, PC

(57) ABSTRACT

An improved sprocket profile for engaging a roller or bush chain smoothly and preventing radial impact with the root of the tooth during engagement. Contact between the sprocket teeth and the roller chain is altered by providing teeth with a root radius equivalent to that of the chain engaging component, with the center point of the root radius located one chordal distance inside the sprocket's pitch circle. This profile allows chain rollers or bushings to impact sprocket teeth tangentially on their flanks rather than radially on their tooth root.

20 Claims, 9 Drawing Sheets

SPROCKET TOOTH PROFILE FOR A ROLLER OR BUSH CHAIN

BACKGROUND OF THE INVENTION

1. Field of the Invention

The invention pertains to the field of sprockets for roller or bush chains. More particularly, the invention pertains to a sprocket that reduces the noise generated when the roller or bush chain and the sprocket mesh.

2. Description of Related Art

Conventional chain sprocket interfaces seat the roller or bush in the root of the sprocket tooth as if the sprocket is held stationary and a taut chain is wrapped around it. A roller swinging-on an arc the length of a chain pitch around the center of the previous roller, located on the pitch circle of the sprocket, contacts the root of the sprocket tooth when reaching the pitch circle of the sprocket.

FIG. 11 shows a chain C having rollers R engaging sprockets S1 and S2. Noise generated by a roller chain meshing with a sprocket is a long recognized problem. One of the most significant sources of noise in a typical roller chain drive results from the repeated impacts between the rollers and the sprockets as the rollers seat between the teeth of the sprocket. As shown in FIG. 12, a roller 10 engaging a sprocket S swings on an arc 20 having a radius equal to the chain pitch P around the center of a seated adjacent roller 30. The roller 10 swings along the arc to make a substantially radial impact with the sprocket tooth root 40.

The prior art discloses attempts to reduce the noise created by rollers impacting a sprocket. Some sprocket designs have attempted to decrease the impact noise of roller chain drives by altering the sprocket tooth profile. One attempt to reduce roller chain and sprocket noise using a modified sprocket tooth profile is described by U.S. Pat. No. 5,921,877. A sprocket tooth profile having three sections is described as making the roller of a chain come into engagement with the teeth of the sprocket without generating a large noise. However, this design is limited to a unidirectional roller chain drive because of the asymmetry of the tooth profile as generally shown by FIG. 13.

Other designs also utilized an asymmetrical tooth design in an effort to reduce the noise generated by the impact of the rollers as they strike the sprocket. U.S. Pat. Nos. 5,921,878 and 5,993,344 disclose an asymmetrical tooth profile that incorporates a flank flat that is tangential to an engaging flank radius and a first root radius, and a pitch mismatch, where the sprocket chordal pitch is less than the chain chordal pitch. This arrangement is described as facilitating a staged roller tooth contact with the sprocket. Again, the asymmetry of the tooth profile mandates a unidirectional roller chain drive system.

Other asymmetrical tooth designs provide a tooth space clearance between the roller and a portion of the tooth root in an attempt to reduce the noise generated by the vibrational contact of unseated rollers with the sprocket teeth as the rollers wear. FIG. 14 illustrates one such design. Instead of impacting the bottom of the tooth root, the roller makes radial contact with the flanks of adjacent teeth at locations A1 and A2 while bridging over the bottom of the tooth root. This sprocket is also designed for a unidirectional roller chain drive system. Similarly, U.S. Pat. No. 5,397,278 simply reduces the gap between adjacent sprocket teeth, such that the roller makes simultaneous radial contact with the flanks of adjacent teeth. However, this design may be used in a multi-directional roller chain drive system.

U.S. Pat. No. 6,736,744 discloses a sprocket that substantially avoids radial impact of chain rollers with the sprocket. The tooth root radius of the sprocket is increased while the sprocket pitch circle diameter is maintained. Thus, a clearance between the roller and the tooth root is created, which allows rollers of a chain of like pitch to impact the sprocket teeth in a substantially tangential fashion on their flanks, rather than substantially radially on the tooth root. Backlash is not minimized with this design.

Similarly, U.S. Publication No. 2003/0186766 discloses an engaging flank profile with seating, impact and distal portions, all with arcs with well-defined radii and arc centers. The profile of the disengaging flank is determined in accordance with a modified form of the JIS standard, in which the sprocket pitch is smaller than the roller chain pitch. The impact point is located at the tangent point to permit a gradual change in the roller velocity. Backlash is not minimized with this design.

Therefore, there is a need in the art for a multi-directional sprocket that substantially minimizes the noise generated by the substantially radial impacts between the rollers of a roller chain and a sprocket, while minimizing backlash.

SUMMARY OF THE INVENTION

An improved sprocket profile engages a roller or bush chain smoothly and prevents radial impact with the root of the tooth during engagement. Teeth on the sprocket have a root radius equivalent to that of the chain engaging component, with the center point of the root radius located one chordal distance inside the sprocket's pitch circle. This profile allows chain rollers or bushings to impact sprocket teeth tangentially on their flanks rather than radially on their tooth root. The present invention is applicable to both roller and bush chains.

DETAILED DESCRIPTION OF THE INVENTION

Figure 1A:
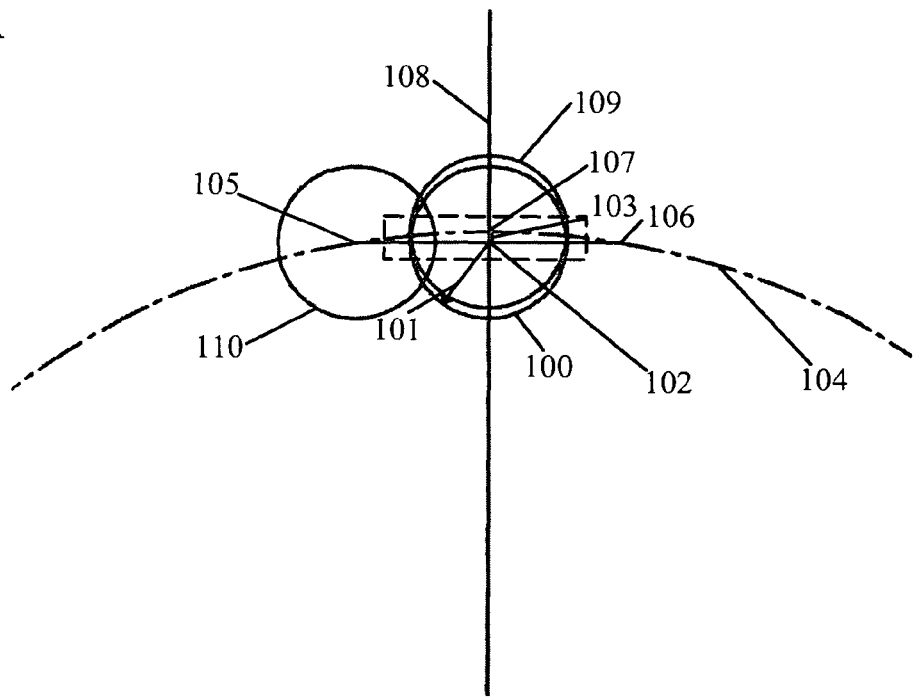
FIG. 1A shows a root radius with its center point located one chordal distance inside a pitch circle of the sprocket in an embodiment of the present invention.

The present invention alters the contact between the sprocket teeth and the roller or bush chain by providing teeth with a root radius equivalent to that of the chain engaging component, with the center point of the root radius located one chordal distance inside the sprocket pitch circle. The present invention uses the standard root radius from ISO, but, unlike the prior art, the root radius is located one chordal distance inside the pitch circle. The present invention decreases noise and backlash.

Chordal distance (also known as chordal rise and fall) is defined as the difference between the distance from the center of the sprocket to the centerline of the chain that is perpendicular to the centerline of the sprocket when a chain roller member (for a roller chain) or a chain bushing member (for a bush chain) is on the sprocket centerline and the distance when two roller members or two bushing members are equally spaced about the sprocket centerline. This value, or radial difference, varies with the chain and/or sprocket pitch.

FIGS. 1-6 show the detail of the construction of the tooth profile of the present invention. FIG. 1A shows the sprocket tooth root (100). The root (100) has a root radius (101), with its center point (102) located one chordal distance (103) inside the sprocket pitch circle (104). The points (105) and (106) where the roller or bush chain pins (not shown) fall on the sprocket pitch circle (104) at a ½ tooth rotation in both directions on the sprocket pitch circle (104) define the bottom point (102) for measuring the chordal distance (103), which is also the center point (102) of the root radius of each of the teeth of the sprocket of the present invention. The point (107) is the centerline of the roller or bush chain (109) that is perpendicular to the centerline (108) of the sprocket. The circle (109) represents both a roller or bush chain, and the isoradius (the circle where the center point is on the centerline of the sprocket pitch circle). The circle (110) shows a 2 rotation of the isoradius (109) along the sprocket pitch circle (104). An enlarged view of the section of FIG. 1A surrounded by the dashed box is shown in FIG. 1B.

Figure 2:
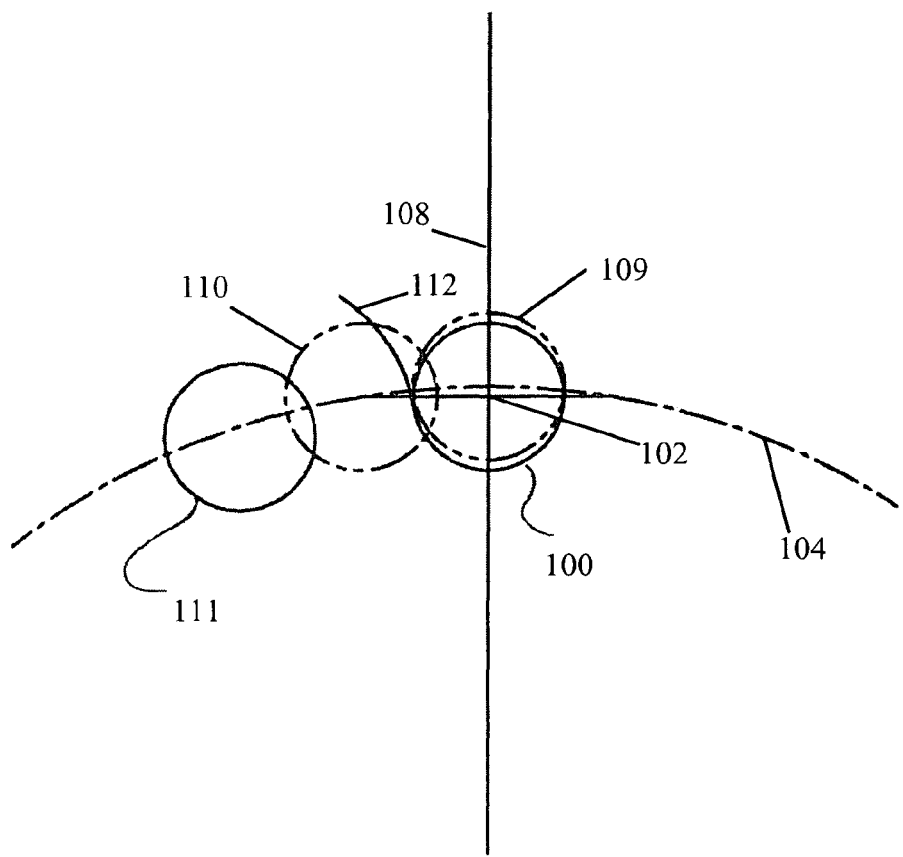
FIG. 2 shows the circle of FIG. 1A rotated the angle of one tooth space and an arc swinging from its center tangent to the first circle.
Figure 3:
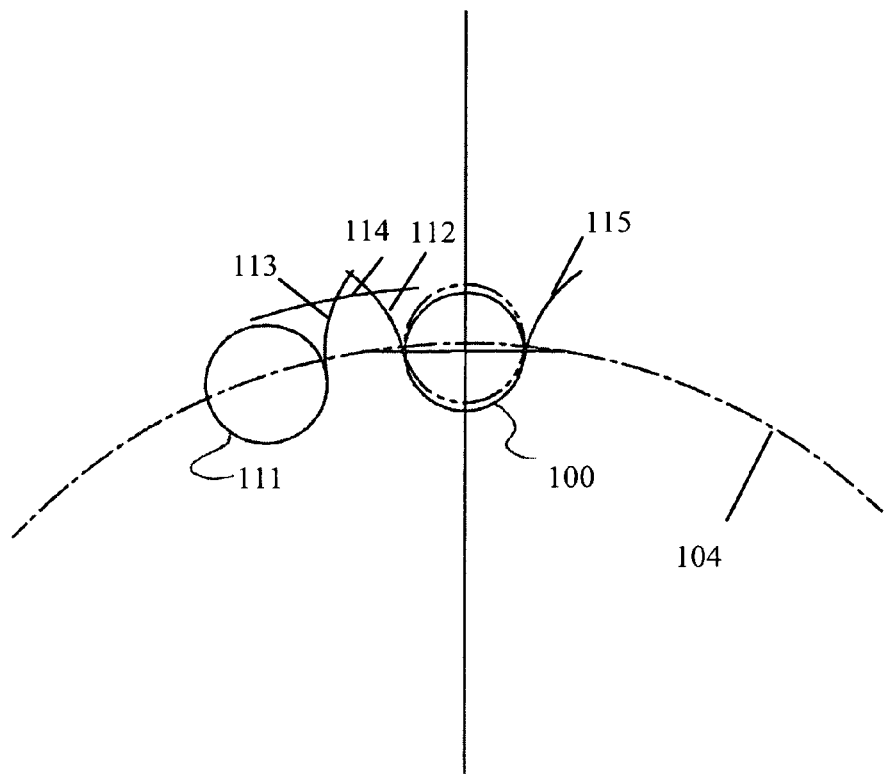
FIG. 3 shows a mirror of the tangent arc of FIG. 2 around a centerline from the center of the pitch circle of the sprocket through the center of the first circle, and copies it rotated the angle of one tooth space, putting it tangent to the second circle.
Figure 4:
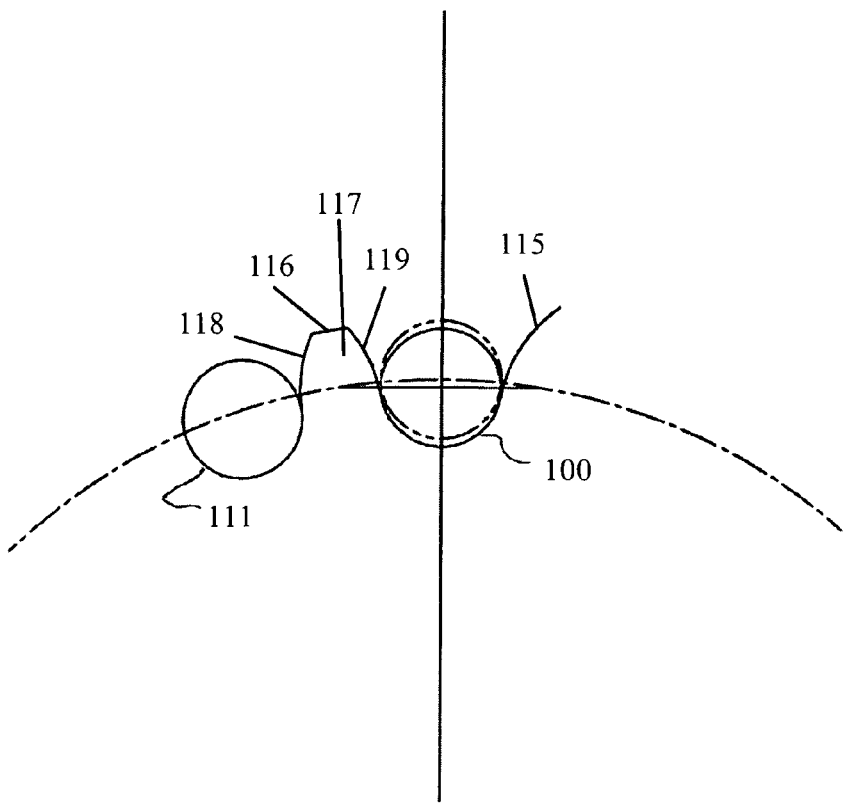
FIG. 4 shows the loose ends forming a trimmed tooth.
Figure 5:
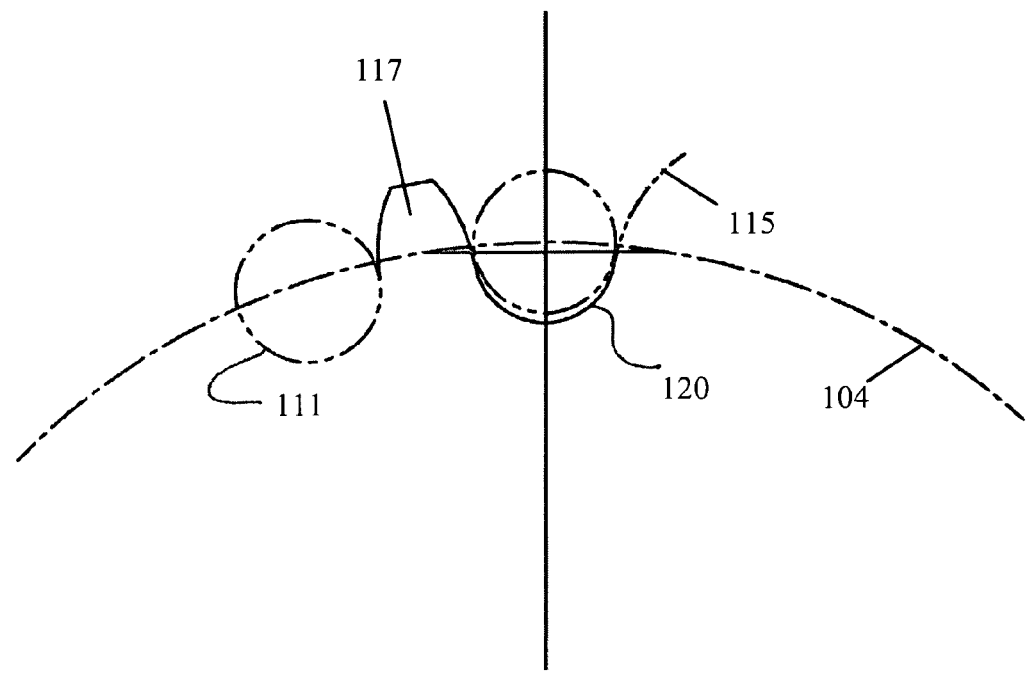
FIG. 5 shows the first circle tangent to the flanks of the adjacent trimmed teeth.
Figure 6:
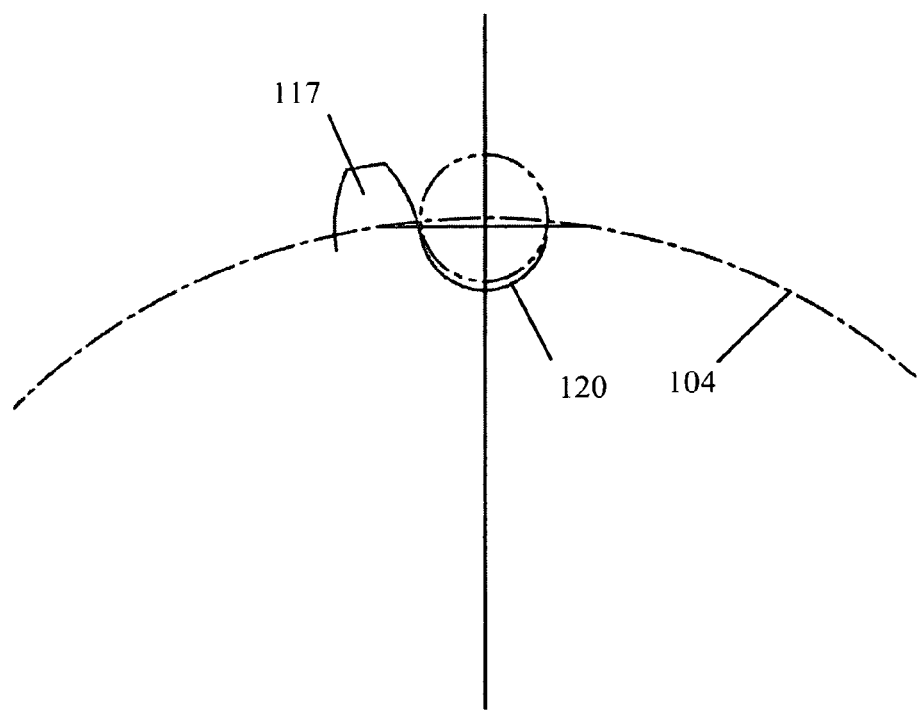
FIG. 6 shows the second circle removed and the mirrored arc leaving a complete tooth.

In FIG. 2, the root radius circle (111) has been rotated the angle of one tooth space and an arc (112) is drawn from the center of circle (111) tangent to the first circle (100). FIG. 3 mirrors that tangent arc (112) around a centerline from the center of the sprocket's pitch circle (104) through the center of the first circle (100) to create a copied tangent arc (113) rotated the angle of one tooth space, thus the second tangent arc (113) is tangent to the second circle (111). An arc (114), representing the tooth tip (116) diameter, is added between the first circle (100) and the second circle (111). A second arc (115) tangent to the first circle (100) is shown to represent an adjacent tooth on the sprocket. FIG. 4 trims the loose ends, and shows a tooth (117) with two flanks (118) and (119) and the tooth tip (116). FIG. 5 trims (120) the first circle tangent to the flanks of the adjacent teeth. FIG. 6 removes the second circle (111) and the mirrored arc (115) leaving a complete tooth (117).

Figure 7:
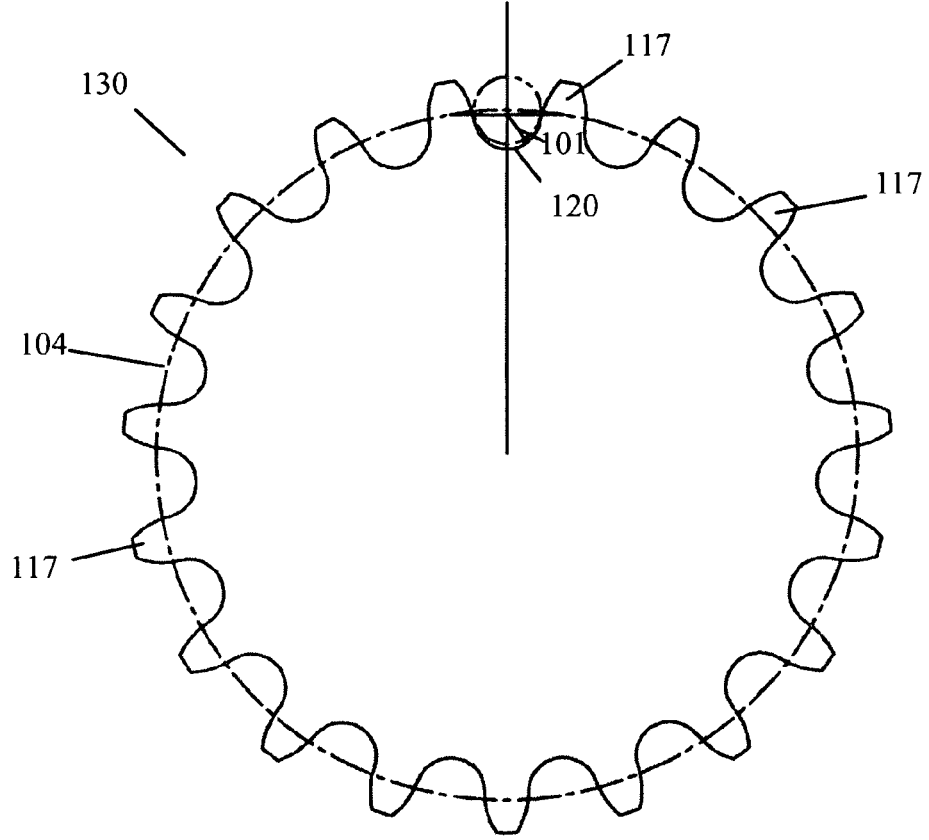
FIG. 7 shows a sprocket profile using the tooth of the present invention.

FIG. 7 shows a sprocket profile (130) using the tooth (117) with an altered root radius (101) of the present invention. The tooth (117) is repeated around the pitch circle (104) the proper number of times to describe the sprocket profile (130).

Figure 8A:
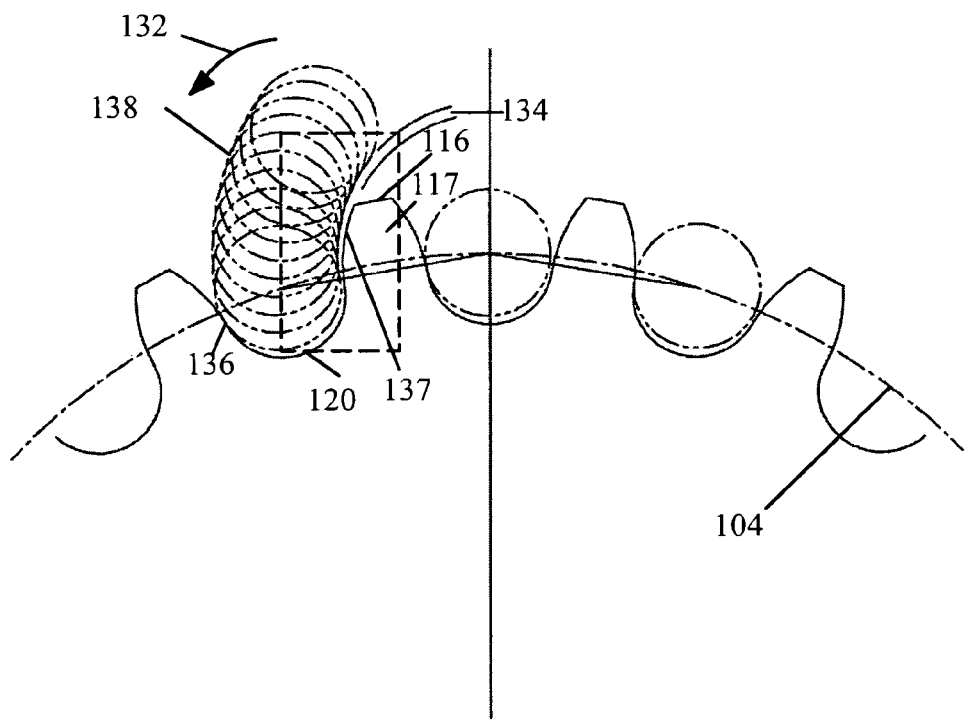
FIG. 8A shows the path of a chain engaging a sprocket tooth in an embodiment of the present invention.
Figure 8B:
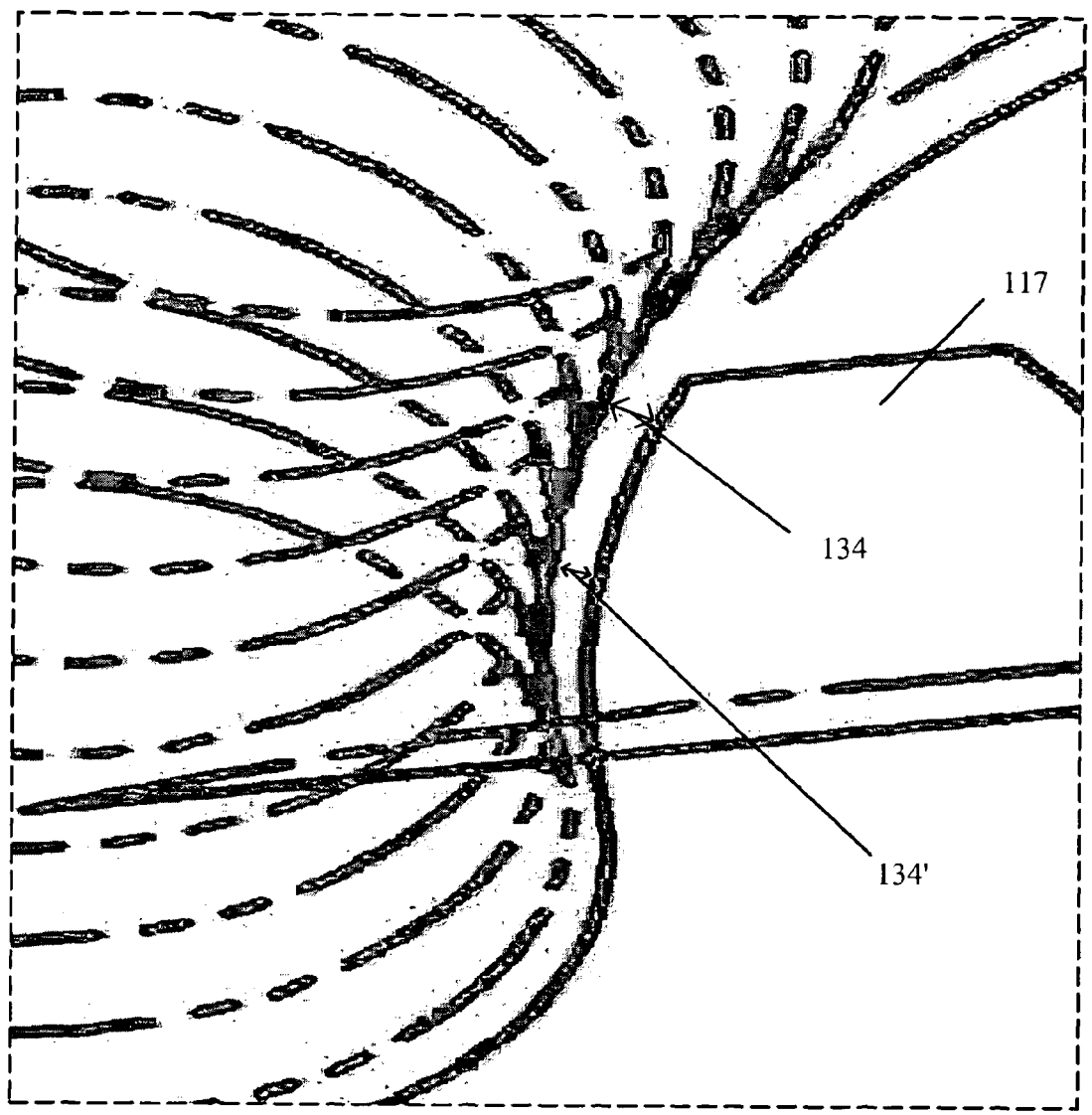
FIG. 8B shows a close up view of the clearance between the chain and the sprocket tooth as the chain engages the sprocket.

FIGS. 8A and 8B illustrate the path (138) of a chain engaging (132) a sprocket tooth (117). The clearance (134), defined as the space between the chain and a tooth flank (137), decreases (134') as the chain engages and enters the root (120). The clearance at the tooth tip smoothly decreases until the point of engagement. The minimum clearance on either or both sides of the chain when it is on the pitch circle (104) is the backlash. Since the rollers are positioned on the pitch circle (104), there is no radial contact. The chain does not impact the root (120) or ride in the root. Instead, there is tangential contact (136) between the chain and the sprocket.

Figure 9:
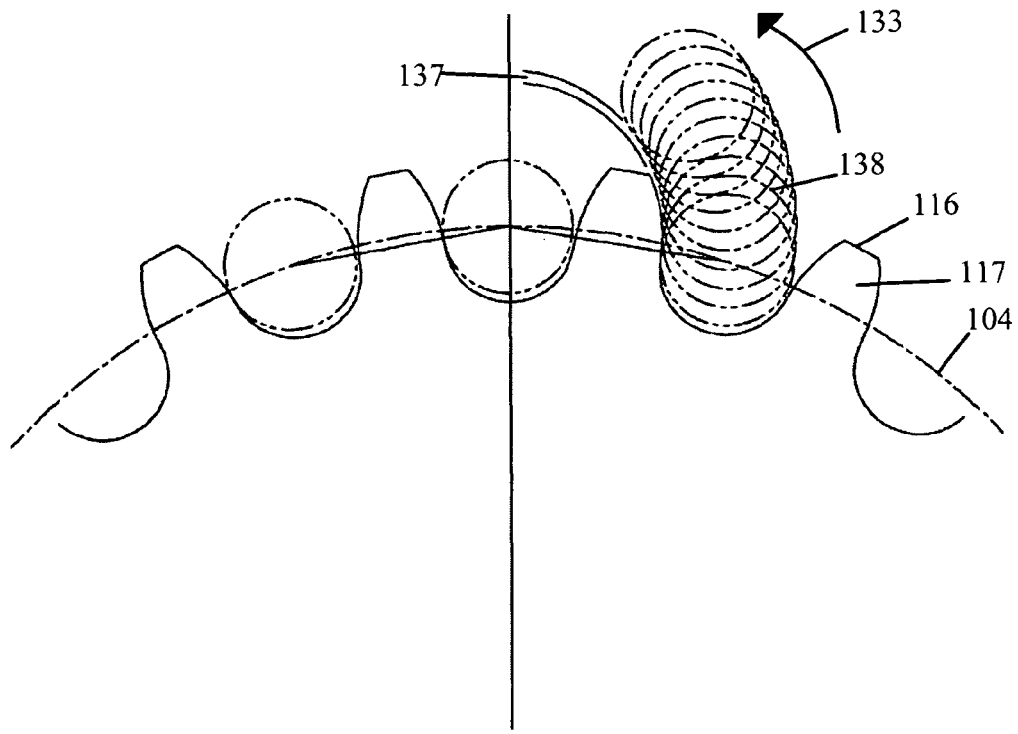
FIG. 9 shows the path of a chain disengaging a sprocket tooth in an embodiment of the present invention.

FIG. 9 illustrates the path (138) of a chain disengaging (133) a sprocket tooth (117). The clearance (137) increases as the chain disengages. The chain disengages smoothly, without interference from the teeth.

Figure 10:
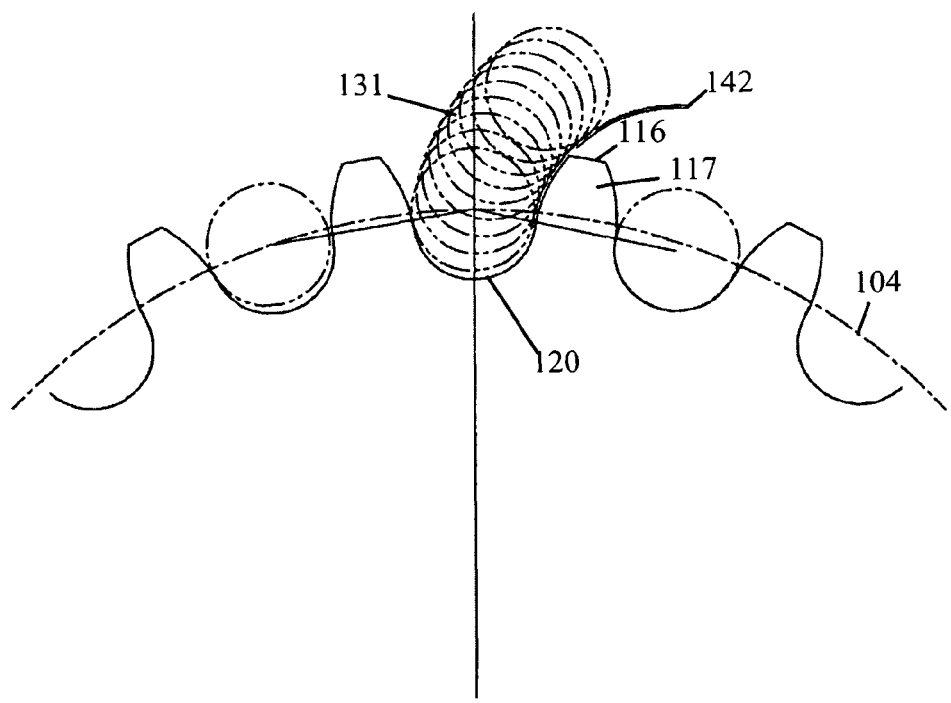
FIG. 10 shows how the rollers of a chain having a roller positioned-at the root of a sprocket tooth smoothly return to the pitch circle in succeeding tooth engagements clearing the tooth with one backlash minimum.
Figure 11:
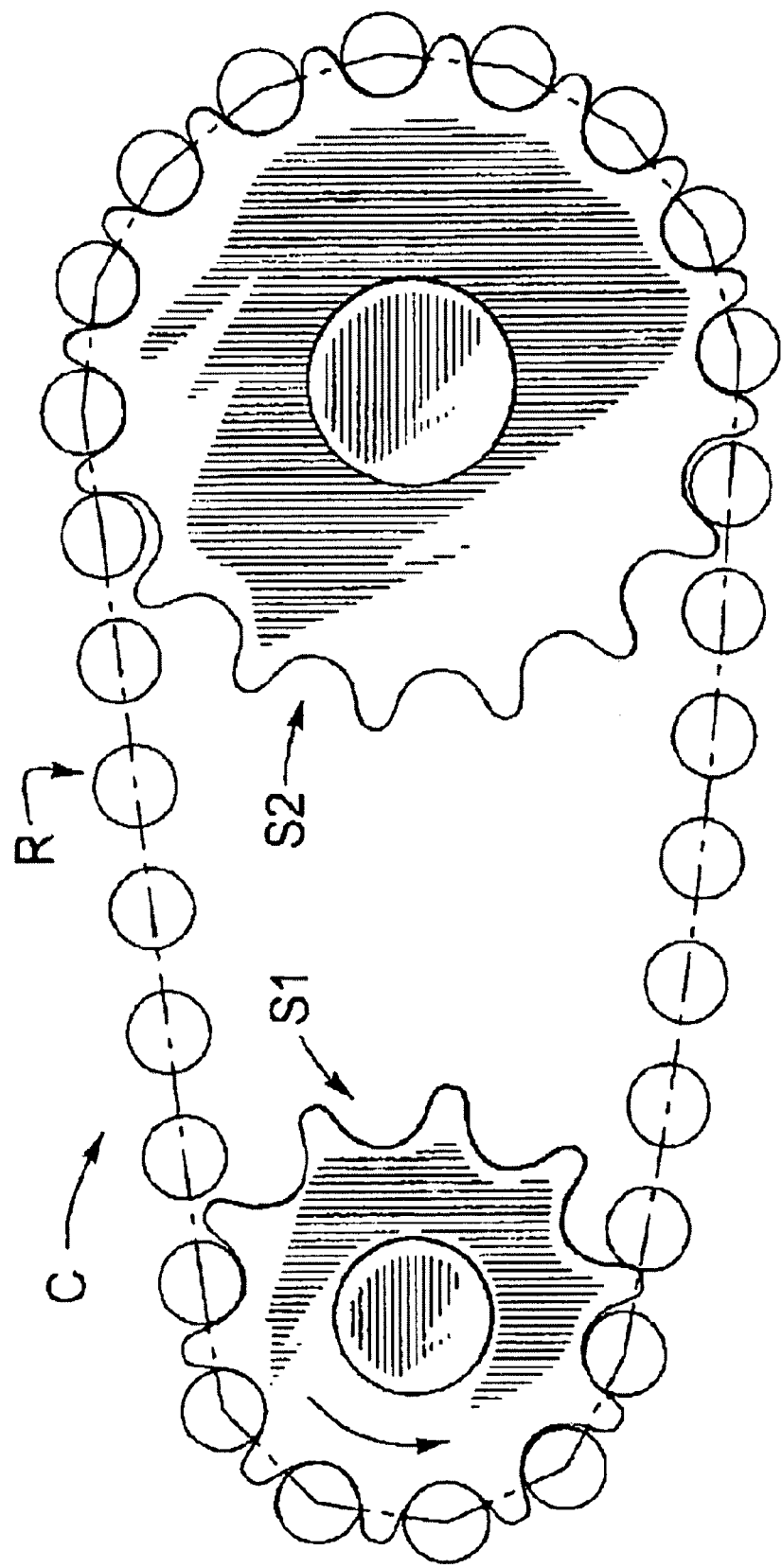
FIG. 11 illustrates a typical roller chain and sprocket drive system.
Figure 12:
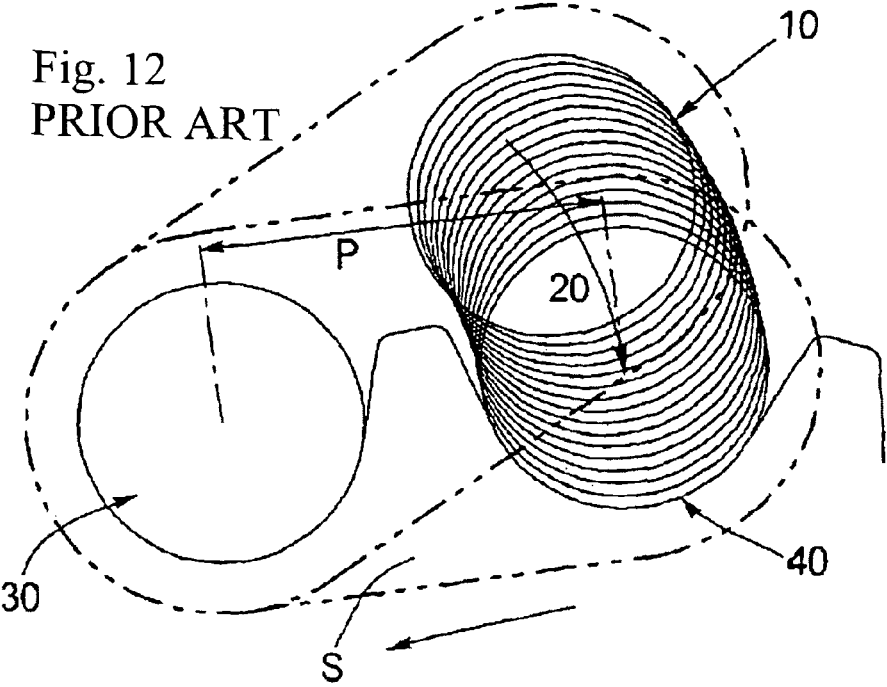
FIG. 12 illustrates the substantially radial meshing of a chain roller with a conventional sprocket.
Figure 13:
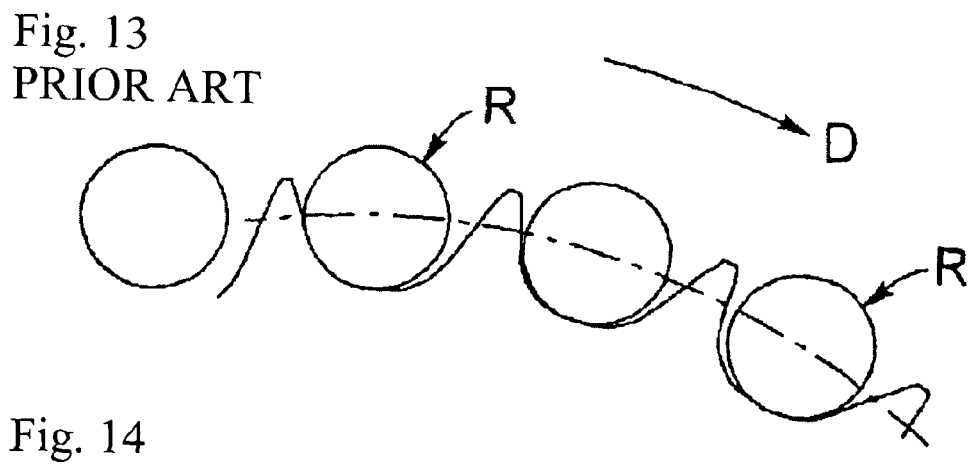
FIG. 13 illustrates a prior art asymmetrical sprocket tooth profile.
Figure 14:
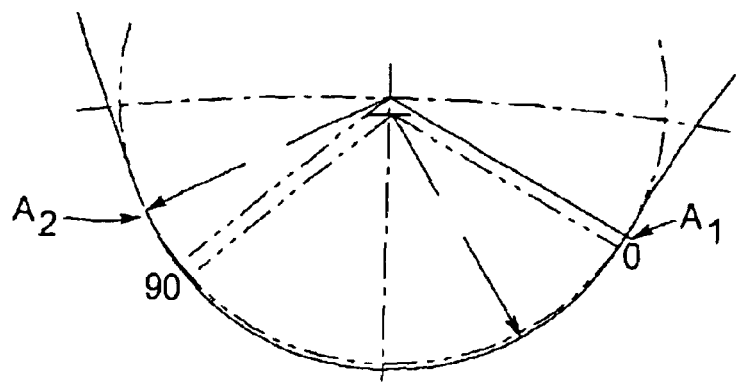
FIG. 14 illustrates the two point contact between the chain roller and a prior art root relieved asymmetrical tooth profile sprocket.

FIG. 10 illustrates how the rollers or bushings of a chain having a roller or bushing positioned at the root (120) of a sprocket tooth (117) smoothly return to the pitch circle (104) in succeeding tooth engagements, clearing the tooth with one backlash (142) minimum. The design of the present invention ensures that there is always sufficient clearance, and no interference between the tooth flanks and the rollers or bushings of the chain, even if the roller or the bushing is deep within the root (120). For example, the roller or the bushing might be deep within the root (120) when the system is stationary.

The chordal distance determines the amount of backlash and, for a given number of teeth, the chordal distance increases as the diameter of the pitch circle decreases. Table 1 shows two examples of sprocket profiles.

TABLE 1

| TEETH (number) | PITCH (mm) | PITCH CIRCLE RADIUS (mm) | CHORDAL DISTANCE (mm) |
|---|---|---|---|
| 10 | 8 | 12.944 | 0.634 |
| 24 | 8 | 30.645 | 0.262 |

Figure 1B:
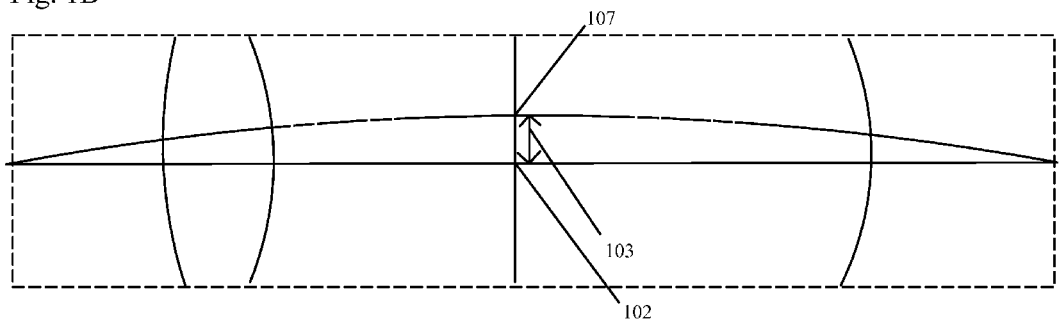
FIG. 1B shows an enlarged view of the chordal distance shown in FIG. 1A.
Figure 1C:
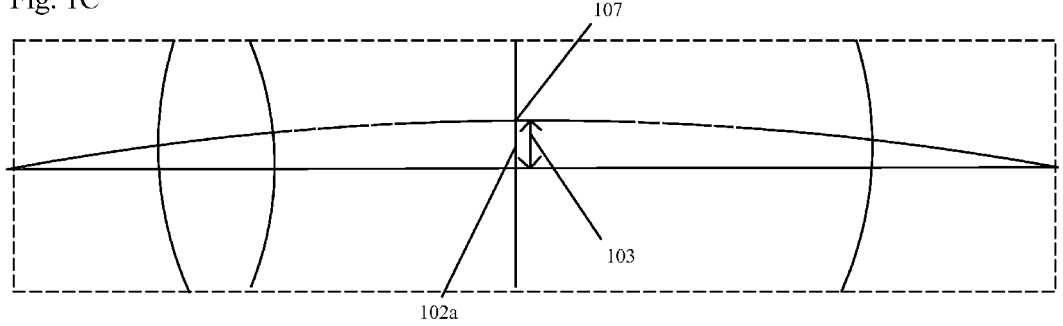
FIG. 1C shows an enlarged view a root radius with its center point located less than one chordal distance inside a pitch circle of the sprocket in an embodiment of the present invention.

In both examples, the pitch has been arbitrarily chosen as 8 mm. In the first example, the sprocket has ten teeth. The pitch circle radius with ten teeth is 12.944 mm. The corresponding chordal distance is 0.634 mm, which is quite large and may cause excessive backlash. Excessive backlash has been shown to be a very important contributor to the level and type of noise produced by a chain and sprocket interface. Therefore, as shown in FIG. 1C, moving the root center point (102a) less than one chordal distance from the sprocket pitch circle may be an advantage in sprockets with small numbers of teeth, including this example with ten teeth. When designing the sprocket with ten teeth, the decision of what value between zero and one chordal distance to choose will depend on the particular design of the sprocket. In the second example, there are 24 teeth. In this example, the pitch circle radius is 30.645 mm, and the chordal distance is 0.262 mm.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A sprocket for use with a roller chain having roller members of a pre-selected radius and located with centers a chain pitch distance apart, the sprocket having a sprocket pitch circle corresponding to a pre-selected roller chain pitch comprising:
   a plurality of teeth spaced about an outer periphery of the sprocket; and
   roots defined by the sprocket between adjacent teeth, each of the roots defining a root arc tangentially joining adjacent teeth and having a tooth root radius having a center point located inside the sprocket pitch circle and each tooth root radius being equal to the pre-selected radius of the roller members;
   wherein each tooth has flanks tangentially joining the tooth to the roots adjacent to the tooth, each flank defining a flank arc having a flank radius having a center point located at the center point of the tooth root radius of the root that joins the other flank of the tooth.

2. The sprocket of claim 1, wherein the center point of the tooth root radius is located less than one chordal distance inside the sprocket pitch circle.

3. The sprocket of claim 1, wherein the center point of the tooth root radius is located approximately one chordal distance inside the sprocket pitch circle.

4. The sprocket of claim 1, wherein the center point of the tooth root radius is located one chordal distance inside the sprocket pitch circle.

5. The sprocket of claim 1, wherein the teeth are formed such that a radial impact between the roller members and the sprocket is substantially prevented.

6. A roller chain and sprocket assembly comprising:
   a roller chain having a pre-selected pitch and roller members of a pre-selected radius; and
   a sprocket having a sprocket pitch circle corresponding to the pre-selected roller chain pitch, the sprocket defining a plurality of teeth spaced about an outer periphery of the sprocket and defining roots between adjacent teeth, each of the roots defining a root arc tangentially joining adjacent teeth and having a tooth root radius having a center point located inside the sprocket pitch circle and each tooth root radius being equal to the pre-selected radius of the roller members, each tooth having flanks tangentially joining the tooth to the roots adjacent to the tooth, each flank defining a flank arc having a flank radius having a center point located at the center point of the tooth root radius of the root that is tangentially joining the other flank of the tooth.

7. The roller chain and sprocket assembly of claim 6, wherein the center point of the tooth root radius is located less than one chordal distance inside the sprocket pitch circle.

8. The roller chain and sprocket assembly of claim 6, wherein the center point of the tooth root radius is located approximately one chordal distance inside the sprocket pitch circle.

9. The roller chain and sprocket assembly of claim 6, wherein the center point of the tooth root radius is located one chordal distance inside the sprocket pitch circle.

10. The roller chain and sprocket assembly of claim 6, wherein the teeth are formed such that a radial impact between the roller members and the sprocket is substantially prevented.

11. A sprocket for use with a bush chain having bushing members of a pre-selected radius and located with centers a chain pitch distance apart, the sprocket having a sprocket pitch circle corresponding to a pre-selected bush chain pitch comprising:
   a plurality of teeth spaced about an outer periphery of the sprocket; and
   roots defined by the sprocket between adjacent teeth, each of the roots defining a root arc tangentially joining adjacent teeth and having a tooth root radius having a center point located inside the sprocket pitch circle and each tooth root radius being equal to the pre-selected radius of the bushing members;
   wherein each tooth has flanks tangentially joining the tooth to the roots adjacent to the tooth, each flank defining a flank arc having a flank radius having a center point located at the center point of the tooth root radius of the root that joins the other flank of the tooth.

12. The sprocket of claim 11, wherein the center point of the tooth root radius is located less than one chordal distance inside the sprocket pitch circle.

13. The sprocket of claim 11, wherein the center point of the tooth root radius is located approximately one chordal distance inside the sprocket pitch circle.

14. The sprocket of claim 11, wherein the center point of the tooth root radius is located one chordal distance inside the sprocket pitch circle.

15. The sprocket of claim 11, wherein the teeth are formed such that a radial impact between the bushing members and the sprocket is substantially prevented.

16. A bush chain and sprocket assembly comprising:
   a bush chain having a pre-selected pitch and bushing members of a pre-selected radius; and
   a sprocket having a sprocket pitch circle corresponding to the pre-selected bush chain pitch, the sprocket defining a plurality of teeth spaced about an outer periphery of the sprocket and defining roots between adjacent teeth, each of the roots defining a root arc tangentially joining adjacent teeth and having a tooth root radius having a center point located inside the sprocket pitch circle and each tooth root radius being equal to the pre-selected radius of the bushing members, each tooth having flanks tangentially joining the tooth to the roots adjacent to the tooth, each flank defining a flank arc having a flank radius having a center point located at the center point of the tooth root radius of the root that is tangentially joining the other flank of the tooth.

17. The bush chain and sprocket assembly of claim 16, wherein the center point of the tooth root radius is located less than one chordal distance inside the sprocket pitch circle.

18. The bush chain and sprocket assembly of claim 16, wherein the center point of the tooth root radius is located approximately one chordal distance inside the sprocket pitch circle.

19. The bush chain and sprocket assembly of claim 16, wherein the center point of the tooth root radius is located one chordal distance inside the sprocket pitch circle.

20. The bush chain and sprocket assembly of claim 16, wherein the teeth are formed such that a radial impact between the bushing members and the sprocket is substantially prevented.

* * * * *